Sept. 16, 1969  J. J. POSEGO  3,467,494
BARIUM CARBONATE PRODUCTION
Filed Oct. 3, 1966  2 Sheets-Sheet 1

INVENTOR
JOHN J. POSEGO
BY
Chisholm and Spencer
ATTORNEYS

United States Patent Office 3,467,494
Patented Sept. 16, 1969

3,467,494
BARIUM CARBONATE PRODUCTION
John J. Posego, New Martinsville, W. Va., assignor to PPG Industries, Inc., a corporation of Pennsylvania
Filed Oct. 3, 1966, Ser. No. 583,761
Int. Cl. C01l 11/18; C01b 17/16
U.S. Cl. 23—66                                    8 Claims

ABSTRACT OF THE DISCLOSURE

Barium carbonate is produced by carbonation of an aqueous barium sulfide solution with carbon dioxide. The amount of soluble barium hydrosulfide in the barium carbonate product is monitored and the ratio of barium sulfide to carbon dioxide controlled in response thereto.

---

The present invention relates to the production of barium carbonate. More particularly, the present invention relates to a method of controlling carbonation of barium sulfide slurries to produce acceptable commercial grade barium carbonate.

Barium carbonate is produced by reacting carbon dioxide and barium sulfide in an aqueous medium. The chemical reaction may be conveniently expressed by the following equation:

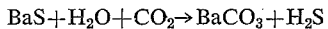

$$BaS + H_2O + CO_2 \rightarrow BaCO_3 + H_2S$$

While in the specification and claims reference to barium sulfide solutions is made it will be understood by the skilled art that this is for convenience. Actually barium sulfide when contacted with water reacts as follows:

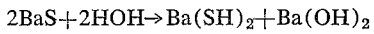

$$2BaS + 2HOH \rightarrow Ba(SH)_2 + Ba(OH)_2$$

Thus, the barium sulfide liquors referred to are liquors containing soluble $Ba(SH)_2$ and $Ba(OH)_2$.

Figure 1:
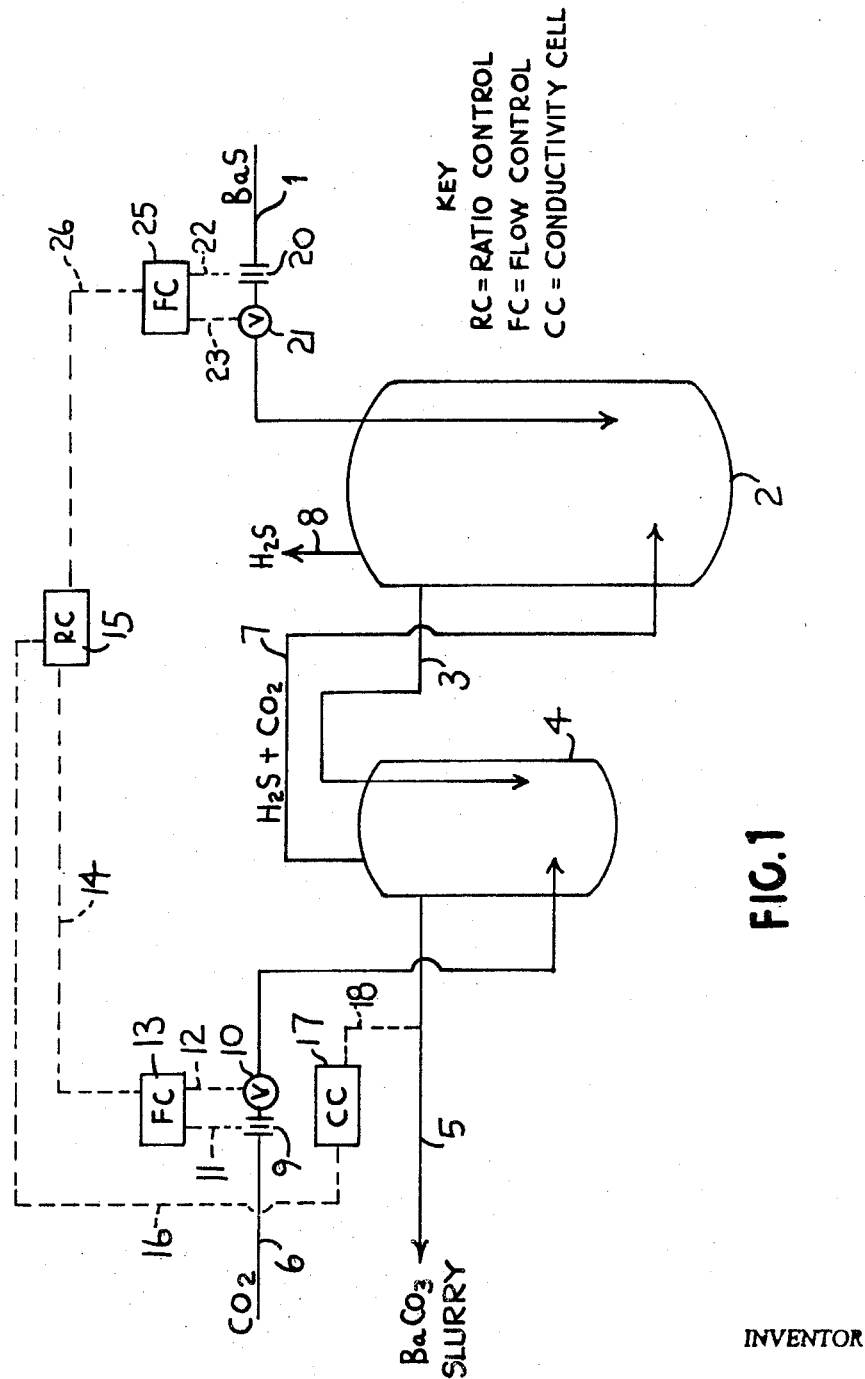
Figure 2:
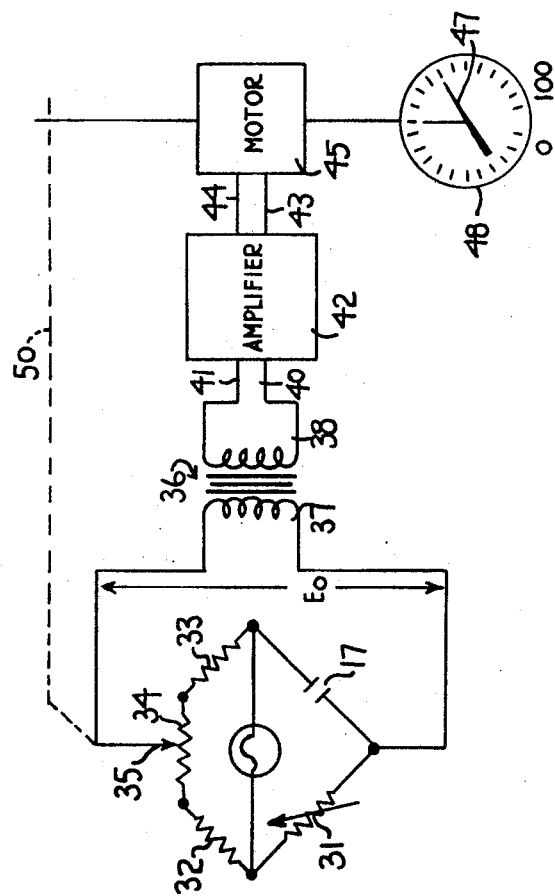

It has been found that barium carbonate of acceptable purity and having good flow properties is produced in accordance with the above reaction when the feed ratios of barium sulfide to carbon dioxide are controlled in response to the presence of soluble barium sulfide in the product barium carbonate liquors. Thus, in accordance with the teachings of this invention of the ratio to barium sulfide to carbon dioxide feed to the carbonation reaction zone or zones is controlled in response to the barium hydrosulfide $Ba(SH)_2$ present in the aqueous barium carbonate product liquors removed from carbonation reaction zone or zones to maintain in such product liquors a weight range of 0.2 to 1.5 percent by weight barium hydrosulfide measured as BaS. By maintaining soluble barium hydrosulfide in this range barium carbonate is produced which contains substantially no contaminating sulfur and which flows readily. The production of long needle-like crystals of barium carbonate is substantially avoided when the feed ratio of carbon dioxide and barium sulfide are controlled to maintain the above limits of soluble barium hydrosulfide in the product barium carbonate liquor. These and other advantages of the instant system will become apparent from the ensuing description taken with the accompanying drawing in which:

FIGURE 1 depicts diagrammatically a carbonation train suitable for barium carbonate production and equipped with automatic monitoring system; and FIGURE 2 diagrammatically illustrates a suitable circuit associated with the conductivity cell for control of the carbonation system of FIGURE 1.

Turning to FIGURE 1 it is seen that barium sulfide in aqueous media is fed via line 1 to the initial carbonator 2. Liquor is removed from the initial carbonator 2 via line 3 and is fed to a second carbonator 4. The product liquor or barium carbonate suspension or slurry is removed from the second carbonator 4 via line 5.

Carbon dioxide is introduced into the system via line 6 and through that line it enters the carbonator 4. Hydrogen sulfide generated by the reaction of carbon dioxide and barium sulfide occurring in carbonator 4 as well as excess or unreacted carbon dioxide are removed from carbonator 4 via line 7 and are fed to the bottom of carbonator 2. The hydrogen sulfide gases are removed from the carbonator 2 via line 8.

The carbon dioxide gas is fed through a meter 9 controlled by a valve member 10. The valve and meter are electrically connected via lines 11 and 12 to a flow control instrument 13. The flow control instrument 13 is electrically connected via line 14 to a ratio control instrument 15.

In line 5 there is positioned an electrically conductive set of probes (not shown) which are connected via line 18 to an electrical conductivity meter or cell 17. The cell or meter 17 is connected via line 16 to the ratio controller 15.

In the barium sulfide feed line 1 there is located a meter 20 and valve 21 electrically connected via lines 22 and 23, respectively, to a flow control instrument 25. The flow control instrument 25 is connected via line 26 to the feed ratio controller 15.

In the operation of this system barium sulfide is passed into the unit 2 via line 1 and through line 3 to the unit 4. Carbon dioxide is passed through line 6 to unit 4 and then via line 7 to unit 2. The conductivity cell is actuated when barium carbonate is taken out of the unit 4 as a slurry. In its passage through line 5 the electrical conductivity of the solution is measured to determine the soluble barium hydrosulfide present therein. The conductivity cell may be preset to conduct an impulse via line 16 to the ratio control instrument 15 when the concentration of barium hydrosulfide exceeds 1.5 percent by weight or falls below 0.2 percent by weight measured as barium sulfide.

The ratio control instrument 15 in respect to such an impulse will be suitable electrical impulses transmitted via lines 14 and 26 activate the flow control devices 13 and 25 to cause them to adjust the flows of fluids in lines 6 and 1, respectively.

While the fluid flow in both lines 1 and 6 may be controlled in this manner it will be obvious that the feed ratio may also be controlled by permitting a constant flow in one line while adjusting flow in the other in response to deviations in concentration of barium hydrosulfide in line 5 as measured by the cell 17. Thus, for example, the flow of barium sulfide to the carbonation tower or zone 2 can be made constant while the flow of carbon dioxide to the carbonator 4 can be varied to control the ratio of feeds in response to impulse generating deviations in concentrations of solubles in the barium carbonate slurry. In a similar fashion the flow can be constant with respect to the carbon dioxide feed to unit 4 via line 6 and the barium sulfide flow controlled as a variable feed in response to impulse generating deviations from the desired concentration level as measured by the meter 17.

The monitoring system associated with the carbonation train shown in the drawing permits a rapid response to soluble sulfide deviations in product slurries from norms established to produce acceptable commercial grade barium carbonate. Thus, with this monitoring system a positive control is placed on the carbonation reaction system which provides a barium carbonate product slurry which can be maintained within set limits as regards its soluble barium hydrosulfide concentrations. With this control in operation no appreciable quantities of unacceptable barium carbonate are permitted to be produced.

Normally the barium carbonate slurries removed via line 5 are neutralized with alkali (typically $Na_2CO_3$) to eliminate the soluble barium hydrosulfide. With inadequate control over the carbonation system large quantities of soluible barium hydrosulfide can appear in line 5 such as quantities on the order of several percent. Large quantities of soluble barium hydrosulfide in the product slurry of course requires large quantities of alkali for reaction therewith and results in a considerable cost. In addition product purity is effected. Precise and rapid control of the carbonation also permits the production of high purity (substantially no $CO_2$ contamination) hydrogen sulfide. Thus, economic utilization of the carbon dioxide is realized utilizing the system of the instant invention since excess feed of $CO_2$ is avoided and as a result high purity hydrogen sulfide is produced along with the high purity barium carbonate product.

The carbonation vessels illustrated diagrammatically as 2 and 4 in the drawing may be operated conveniently at atmospheric pressures. If desired the temperatures may be varied considerably and any temperature may be employed which will permit the reaction of barium sulfide with the $CO_2$ to take place. In general the temperature is maintained between 120° F. and 215° F. While atmospheric pressures may be conveniently employed recourse to superatmospheric pressures where desired may be had.

The units 2 and 4 can be simply tanks or may if desired take the form of gas-liquid contact towers. Obviously these vessels may be equipped with suitable baffles to facilitate the contact of gas and liquid as they pass through the system in counter current contact with each other. In a preferred embodiment stirred tanks are employed.

The particular flow control devices 13 and 25 can be any flow control instrument which will accurately measure fluid flow in a line and which can control that flow in response to an impulse, either mechanical or electrical. Typically, meters such as orifice meters, Thomas electric meters, magnetic core meters and other similar flow measuring devices can be employed. So long as the flow meter will measure the flow of gas ($CO_2$) and barium sulfide liquors it is suitable. These meters may be readily equipped with electrical or pneumatic transmission equipment to register flow on indicators or charts for constant recordation or to feed an impulse to a control instrument. Similarly, the valves associated with such meters can be opened or closed, wholly or in part, in response to electrical or pneumatic impulses fed to them from control equipment. In general, meters of the type typically used for this type of service are described in the Chemical Engineers' Handbook, Textbook Edition, second edition, pp. 2188 and 2189, McGraw-Hill Book Co., New York, 1941.

In the operation of the conductivity cell, the measurement is made using a Wheatstone bridge to exert control on the carbonation system in response to varying conductivity measurements as shown in FIGURE 2.

As shown in FIGURE 2 the instrument of cell 17 of FIGURE 1 forms one leg of a Wheatstone bridge. A second leg of the bridge is a temperature compensator (variable resistor) 31. Located in the other two arms of the bridge circuit are fixed resistors 32 and 33 with a variable resistor 34 located between them and equipped with a slide wire 35. Connected across the bridge itself is the primary coil 37 of a transformer generally indicated at 36. The secondary coil 38 of the transformer feeds via lines 40 and 41 the amplifier 42 which in turn via lines 43 and 44 actuates motor 45. Motor 45 drives mechanically the dial member 47 on dial 48.

In operation of the devices the bridge is first balanced by selecting a set on the dial 48 for the desired conductivity of the solution and balancing the bridge circuit with this set point using the slide wire 35 on the variable resistor 34 until the potential $E_0$ is zero. Once this is established the meter can be operated with the conductivity cell 17 to measure fluctuations from the set point. Voltages which unbalance the bridge circuit are transmitted to the transformer 36 and through the amplifier and motor to the dial 48. Motor 45 is mechanically connected to the slide wire 35 via line 50 and the fluctuation in voltage recorded by arm 47 is transmitted mechanically via line 50 to automatically balance the bridge circuit again. As will be readily understood by the skilled in the art, this device is suitably wired through the dial member 48 to a ratio controller 15 via line 16 of FIGURE 1 so that deviations in the dial 48 reading which represent values above 1.5 percent by weight BaS in the product slurries or which represent values below 0.2 percent by weight BaS in the product slurries will cause rapid and automatic change in the feed ratio of $CO_2$ to BaS in the carbonation system of FIGURE 1.

In the preferred operation of the instant system the carbonation of BaS is carried out in sequential carbonation zones with countercurrent flow of $CO_2$ and BaS liquor. This type of system appears to give maximum circulation of liquor and gas thus facilitating reaction of the barium sulfide and carbon dioxide. While multiple carbonation zones, operated in series with countercurrent gas to liquid flow is preferred, it is of course possible to utilize a single carbonation zone if desired. Similarly, while countercurrent gas-liquid content is a preferred embodiment, the utilization of cocurrant contact is not precluded. Similarly if desired, mechanical agitation in carbonation tanks can be employed where feasible or desirable to assist in causing reaction between the gas and liquid.

Preferably in operation of the carbonation system of the instant invention automatic control of the feed ratio of carbon dioxide to barium sulfide is maintained in such a manner that the barium carbonate slurries removed from the carbonation system on a continuous basis have a soluble barium hydrosulfide content measured as BaS of between 0.4 to 0.6 percent by weight. Operation of the carbonation at these weight levels in the product slurries gives rise to the production of excellent product substantially free of impurities and having acceptable crystal configuration for imparting good flow properties to the barium carbonate. Deviations in concentration of the product slurries can be tolerated to the extent of having between 0.2 to 1.5 percent by weight soluble barium hydrosulfide measured as BaS and acceptable barium carbonate product obtained.

In discussing the control equipment, the unit 17 has been referred to as a conductivity cell or meter. This device is an electrical conductivity meter which measures the conductivity of electrolyte and correlates that measurement to a corresponding concentration. The cell used to measure the conductivity of the solution to be examined contains probes which are electrodes and these are inserted directly into the solution tested. While in general these electrodes are shielded to prevent damage during operation in measuring barium carbonate slurries, it is preferred that they be inserted without shielding. The typical operation of such meters is adequately described on pp. 2079 and 2080 of Perry's Chemical Engineers' Handbook, second edition. When using shields on the electrodes of the conductivity cell in the barium carbonate slurries of the system of FIGURE 1, excessive fouling and buildup on the shields of solids necessitating many calibration changes were required. When the shields were removed and the electrodes were inserted directly in the solution this problem was greatly minimized and the electrodes were not damaged in any way by the flowing slurry.

In the commercial operation of barium carbonate production units of the type shown in FIGURE 1 previous to the instant discovery, the carbonation system was controlled by periodically removing a sample from line 5. After filtering the sample $Na_2CO_3$ solution was added to a centrifuge test tube containing the filtrate. After centrifuging, the quantity of precipitate formed is used to indicate barium concentration. This procedure required considerable time and of course if concentrations were out of line with the desired standard, this was not discovered in time to prevent the production of large quantities of material having undesirable qualities. With the instant system a positive control can now be placed upon the system to insure that high quality product will be continuously removed from the system in product line 5. Thus, now there is provided a continuous carbonation system for the production of barium carbonate from barium sulfide containing liquors which on a continuous basis produces a barium carbonate slurry from which high grade commercial barium carbonate may be recovered by recourse to conventional methods of recovery such as by filtering for example.

While the description, drawing and in particular FIGURE 1 sets forth certain modes of operation which form preferred embodiments of the instant invention, it is not intended that it be so limited since obvious modifications can be made without departing from the spirit of the invention. As an example, the control of feed ratios can be through more than one feed line for $CO_2$ and more than one feed line for BaS solution without departing from the spirit of the invention. Thus, if a separate $CO_2$ feed to unit 2 was desired it could be included in the system of FIGURE 1 and connected to the instrument 15 so that it would respond to measurements of conductivity in line 5 made by the unit 17. Thus, the invention is not intended to be limited by the disclosure made herein except insofar as appears in the accompanying claims.

What is claimed is:

1. A method of producing barium carbonate substantially free of sulfur contamination comprising feeding carbon dioxide and an aqueous barium sulfide solution to a carbonation zone, carbonating said barium sulfide in said zone with said carbon dioxide to thereby produce hydrogen sulfide and barium carbonate, removing an aqueous suspension of barium carbonate from said zone, monitoring said suspension for soluble barium hydrosulfide content and adjusting the feed ratio of carbon dioxide to barium sulfide fed to said zone to maintain in said suspension between 0.2 and 1.5 percent by weight soluble barium hydrosulfide measured as BaS.

2. A method of producing barium carbonate substantially free of sulfur contamination comprising continuously feeding barium sulfide liquor to a carbonation zone, feeding gaseous carbon dioxide to said carbonation zone continuously and in countercurrent contact with barium sulfide liquor, agitating said liquor during contact and reacting said barium sulfide liquor and carbon dioxide to produce barium carbonate, continuously removing barium carbonate slurry from said carbonation zone, adjusting the feed ratio of carbon dioxide to barium sulfide to maintain a soluble barium hydrosulfide concentration in said barium carbonate slurry of between 0.2 and 1.5 percent by weight BaS and continuously controlling the ratio of carbon dioxide to barium sulfide fed to the carbonation zone to provide this concentration in the slurry on a continuous basis.

3. The method of claim 2 wherein the soluble barium hydrosulfide concentration is between 0.4 and 0.6 percent by weight.

4. The method of claim 2 wherein the concentration of soluble barium hydrosulfide in the barium carbonate slurry is measured by measuring the electrical conductivity of the slurry.

5. A method of continuously producing barium carbonate comprising feeding gaseous carbon dioxide and an aqueous barium sulfide solution to a carbonation zone, contacting said carbon dioxide and barium sulfide in said zone to cause them to react to thereby produce barium carbonate and hydrogen sulfide, removing continuously from said zone a slurry of barium carbonate while controlling the feed ratio of said carbon dioxide to barium sulfide solution to provide in said barium carbonate slurry between 0.2 and 1.5 percent by weight soluble barium hydrosulfide measured as barium sulfide.

6. The method of claim 5 wherein the feed ratio of said carbon dioxide to barium sulfide solution is controlled to provide in said barium carbonate slurry between 0.4 and 0.6 percent soluble barium hydrosulfide measured as barium sulfide.

7. A method of producing barium carbonate comprising the steps of
  (a) feeding barium sulfide liquor sequentially through at least two carbonation zones in a direction countercurrent to the flow of carbon dioxide feed to said zones;
  (b) reacting in said zones carbon dioxide and barium hydrosulfide to produce barium carbonate and hydrogen sulfide;
  (c) removing from the first carbonation zone through which said liquor travels hydrogen sulfide gas substantially free of carbon dioxide;
  (d) removing from the last carbonation zone to which said liquor is fed a slurry of barium carbonate containing soluble barium hydrosulfide of between 0.2 and 1.5 percent by weight measured as barium sulfide;
  (e) continuously monitoring the electrical conductivity of said barium carbonate slurry to determine the soluble barium hydrosulfide content thereof; and
  (f) adjusting the feed ratio of carbon dioxide to barium sulfide liquor in response to concentrations above or below the values in step (d) to thereby maintain the concentration of said barium hydrosulfide within the range set forth in step (d).

8. The method of claim 7 wherein the slurry in step (d) contains from 0.4 to 0.6 percent by weight barium hydrosulfide measured as barium sulfide and in step (f) the feed ratio of carbon dioxide to barium sulfide is adjusted to maintain this 0.4 to 0.6 percent value therein.

References Cited

UNITED STATES PATENTS

| | | | |
|---|---|---|---|
| 1,067,595 | 7/1913 | Ekstrom | 23—66 X |
| 1,145,509 | 7/1915 | Pike et al. | |
| 1,341,790 | 6/1920 | Edelman. | |
| 1,399,181 | 12/1921 | Bascom. | |
| 2,198,640 | 4/1940 | Stump | 23—66 |

FOREIGN PATENTS 334,709   9/1930   Great Britain.

OSCAR R. VERTIZ, Primary Examiner

G. T. OZAKI, Assistant Examiner

U.S. Cl. X.R.

23—181; 230